(12) United States Patent
Nakano et al.

(10) Patent No.: US 10,735,051 B2
(45) Date of Patent: Aug. 4, 2020

(54) INFORMATION TERMINAL APPARATUS

(71) Applicant: Murata Manufacturing Co., Ltd., Nagaokakyo-shi, Kyoto-fu (JP)

(72) Inventors: Shinichi Nakano, Nagaokakyo (JP); Teppei Miura, Nagaokakyo (JP); Noboru Kato, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 451 days.

(21) Appl. No.: 15/050,539

(22) Filed: Feb. 23, 2016

(65) Prior Publication Data
US 2016/0173170 A1 Jun. 16, 2016

Related U.S. Application Data

(63) Continuation of application No. 14/445,156, filed on Jul. 29, 2014, now Pat. No. 9,298,226, which is a continuation of application No. PCT/JP2013/083399, filed on Dec. 12, 2013.

(30) Foreign Application Priority Data

Dec. 20, 2012 (JP) .................................. 2012-278413
Jul. 2, 2013 (JP) .................................. 2013-138582

(51) Int. Cl.
*H04B 5/00* (2006.01)
*H01Q 7/00* (2006.01)
*G06K 7/10* (2006.01)
*G06F 1/18* (2006.01)
*H01Q 1/22* (2006.01)
*H01Q 13/10* (2006.01)

(52) U.S. Cl.
CPC ........... *H04B 5/0031* (2013.01); *G06F 1/182* (2013.01); *G06F 1/189* (2013.01); *G06K 7/10386* (2013.01); *H01Q 7/00* (2013.01); *H01Q 1/2266* (2013.01); *H01Q 13/10* (2013.01)

(58) Field of Classification Search
CPC combination set(s) only.
See application file for complete search history.

(56) References Cited

U.S. PATENT DOCUMENTS

| 8,270,914 B2 | 9/2012 | Pascolini et al. |
| 2010/0148968 A1* | 6/2010 | Casden ............ G06K 7/10336 340/572.7 |
| 2010/0321255 A1 | 12/2010 | Kough et al. |

(Continued)

OTHER PUBLICATIONS

Nakano et al., "Informaiton Terminal Apparatus", U.S. Appl. No. 14/445,156, filed Jul. 29, 2014.

*Primary Examiner* — Zhiyu Lu
(74) *Attorney, Agent, or Firm* — Keating & Bennett, LLP

(57) ABSTRACT

An information terminal apparatus includes a flat plate-shaped conductive housing including a first principal surface, a second principal surface, and a side surface that connects the principal surfaces, and a display provided on the first principal surface. The conductive housing includes a slit extending from the first principal surface to the second principal surface. Near the slit, a power feeding coil coupled to an IC element for an HF-band RFID system is disposed. The power feeding coil is magnetically coupled to the conductive housing via the slit. Thus, the conductive housing is utilized as a radiation element of the HF-band RFID system.

5 Claims, 19 Drawing Sheets

(56) References Cited

U.S. PATENT DOCUMENTS

| | | | |
|---|---|---|---|
| 2012/0274800 A1* | 11/2012 | Vakil | H04N 5/2252 |
| | | | 348/222.1 |
| 2013/0094126 A1* | 4/2013 | Rappoport | G02B 27/01 |
| | | | 361/679.01 |
| 2014/0015724 A1* | 1/2014 | Bungo | H01Q 13/10 |
| | | | 343/767 |

* cited by examiner

INFORMATION TERMINAL APPARATUS

BACKGROUND OF THE INVENTION

1. Field of the Invention

The present invention relates to an information terminal apparatus, and more specifically, to an information terminal apparatus that performs near field communication with an external apparatus.

2. Description of the Related Art

In recent years, there have been an increasing number of information terminal apparatuses incorporating an HF (High Frequency)-band RFID (Radio Frequency Identification) system including an NFC (Near Field Communication) system and FeliCa (registered trademark). A notebook PC (Personal Computer) is not an exception.

As a notebook PC incorporating an HF-band RFID system, for example, a notebook PC having a structure disclosed in Japanese Unexamined Patent Application Publication No. 2011-4076 is known. In this notebook PC, IC (Integrated Circuit) elements for an HF-band RFID system are disposed in a housing. In this notebook PC, a coil antenna for the HF-band RFID system is also provided on a back surface of a touchpad. Therefore, when the user holds a card-shaped RFID tag over the touchpad, non-contact communication can be allowed between a reader/writer in the notebook PC and the card-shaped RFID tag.

In recent years, there has been a request to reduce the thickness of notebook PCs. With this requirement, both a housing of a keyboard and a housing of a display have been metalized to increase strength. However, when the housing of the notebook PC of Japanese Unexamined Patent Application Publication No. 2011-4076 is formed of a conductive material such as metal, there is the following problem. That is, when the notebook PC is folded, the coil antenna provided in the touchpad is covered with the conductive housing. If the notebook PC is brought into this state, radio waves are blocked by the conductive housing. Hence, the HF-band RFID system cannot be utilized sufficiently.

SUMMARY OF THE INVENTION

Preferred embodiments of the present invention are configured to properly perform communication using an information terminal apparatus including a conductive housing.

An information terminal apparatus according to a first aspect of various preferred embodiments of the present invention includes a first display, a first conductive housing including a first principal surface from which the first display is exposed, a second principal surface opposite to the first principal surface, and an opening extending from the first principal surface from which the first display is exposed to the second principal surface, and a power feeding coil including a coil aperture facing the opening.

The opening preferably is a slit, for example.

The coil aperture of the power feeding coil preferably overlaps with the opening.

The information terminal apparatus preferably includes a second conductive housing turnably connected to the first conductive housing such that a first principal surface of the second conductive housing is to be opposed to the first principal surface of the first conductive housing.

The information terminal apparatus preferably includes a second display different from the first display, the second principal surface of the first conductive housing preferably includes an aperture from which the second display is exposed, and the opening preferably extends from the first principal surface of the first conductive housing to the aperture from which the second display is exposed.

The opening preferably extends from the first principal surface of the first conductive housing to an aperture provided in the second principal surface of the first conductive housing from which a non-metal member is exposed.

The power feeding coil preferably is disposed on a side of the first principal surface of the first conductive housing.

A side of the power feeding coil facing the second principal surface of the first conductive housing preferably is covered with a magnetic member.

The opening preferably includes a slit and an aperture from which a camera unit is exposed, and the power feeding coil preferably is disposed such that the coil aperture overlaps with the aperture from which the camera unit is exposed.

The first principal surface of the first conductive housing preferably includes an aperture from which the first display is exposed, and the opening preferably extends from the aperture from which the first display is exposed to the second principal surface of the first conductive housing.

The power feeding coil preferably is disposed on a side of the second principal surface of the first conductive housing.

A side of the power feeding coil facing the first principal surface of the first conductive housing preferably is covered with a magnetic member.

The opening preferably includes a slit and an aperture from which a camera unit is exposed, and the power feeding coil is preferably disposed such that the coil aperture overlaps with the aperture from which the camera unit is exposed.

The information terminal apparatus preferably includes a power feeding circuit configured to supply current to the power feeding coil, the power feeding circuit preferably includes a variable-capacitance capacitor coupled to the power feeding coil, and the variable-capacitance capacitor preferably is coupled to an opening and closing circuit configured to detect opening and closing of the first conductive housing and the second conductive housing.

The opening and closing detection circuit preferably is further configured to change a capacitance of the variable-capacitance capacitor in accordance with a detection state of the opening and closing.

An information terminal apparatus according to a second aspect of various preferred embodiments of the present invention includes a first display, a first conductive housing including a first principal surface from which the first display is exposed, a second principal surface opposite to the first principal surface, and an opening provided in at least the second principal surface, and a power feeding coil defined by a chip coil. The second principal surface includes a side facing an outer side of the first conductive housing and a side facing an inner side of the first conductive housing, and the power feeding coil is provided at a position that is spaced a predetermined distance apart from the opening on the side of the second principal surface facing the inner side of the first conductive housing.

According to various preferred embodiments of the present invention, communication is performed in various states even when the housing of the information terminal apparatus is made a conductive material.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
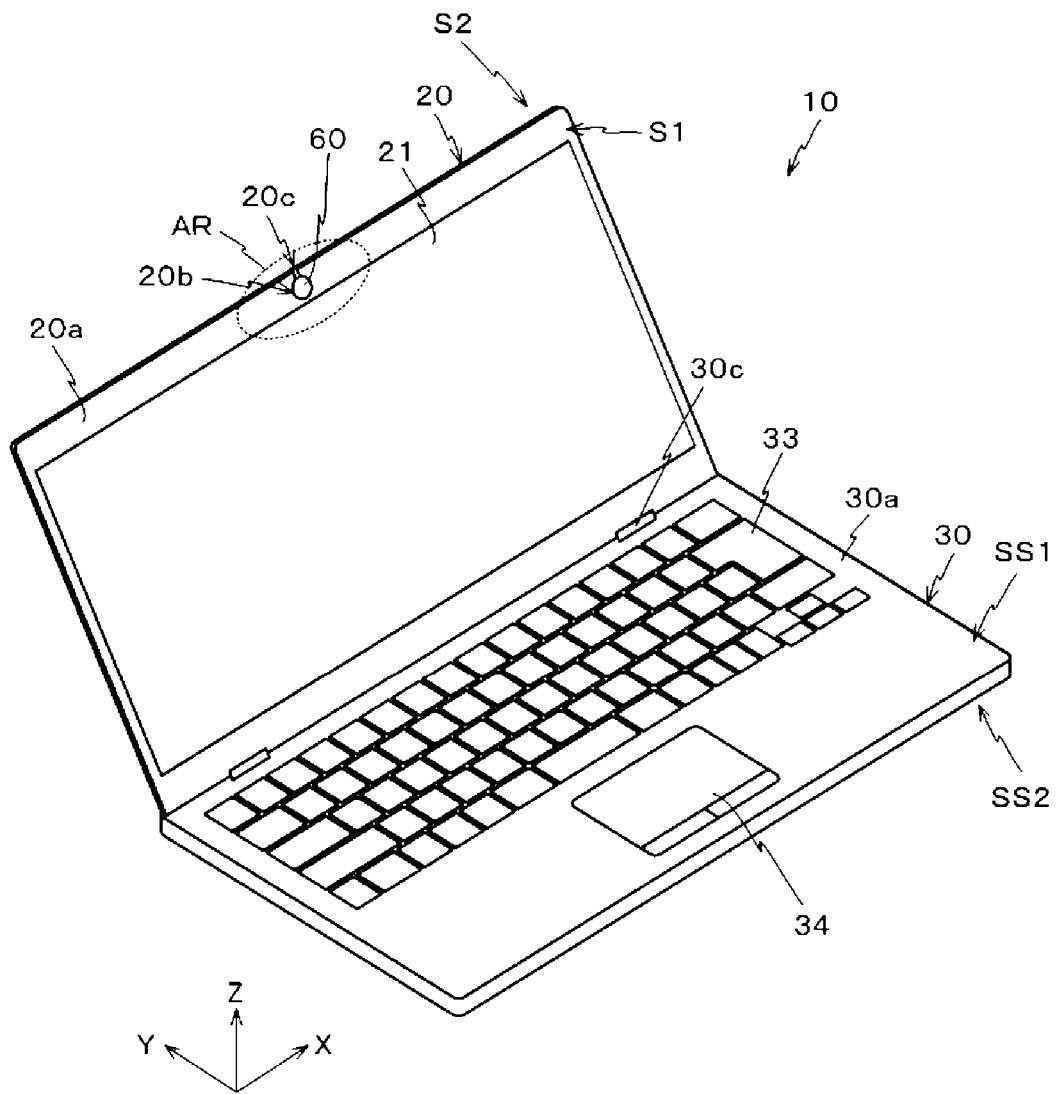
FIG. 1 is a perspective view of an information terminal apparatus according to a first preferred embodiment of the present invention.
Figure 2A:
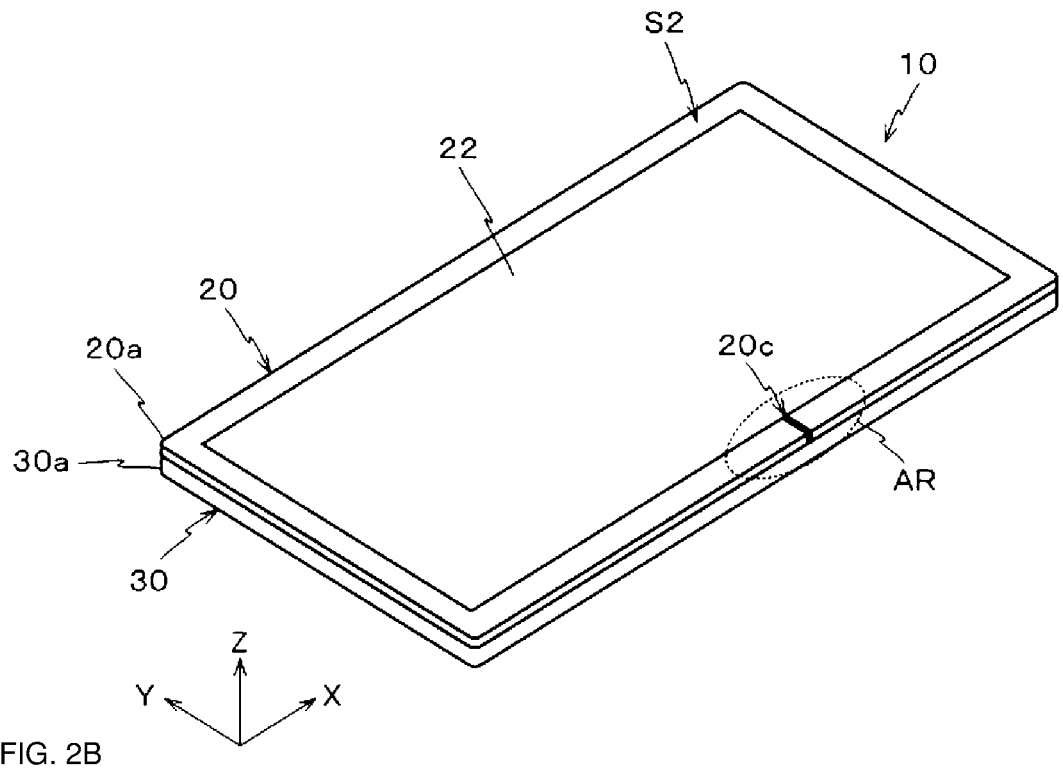
FIG. 2A is a perspective view of the information terminal apparatus of the first preferred embodiment of the present invention in a closed state.
Figure 2B:
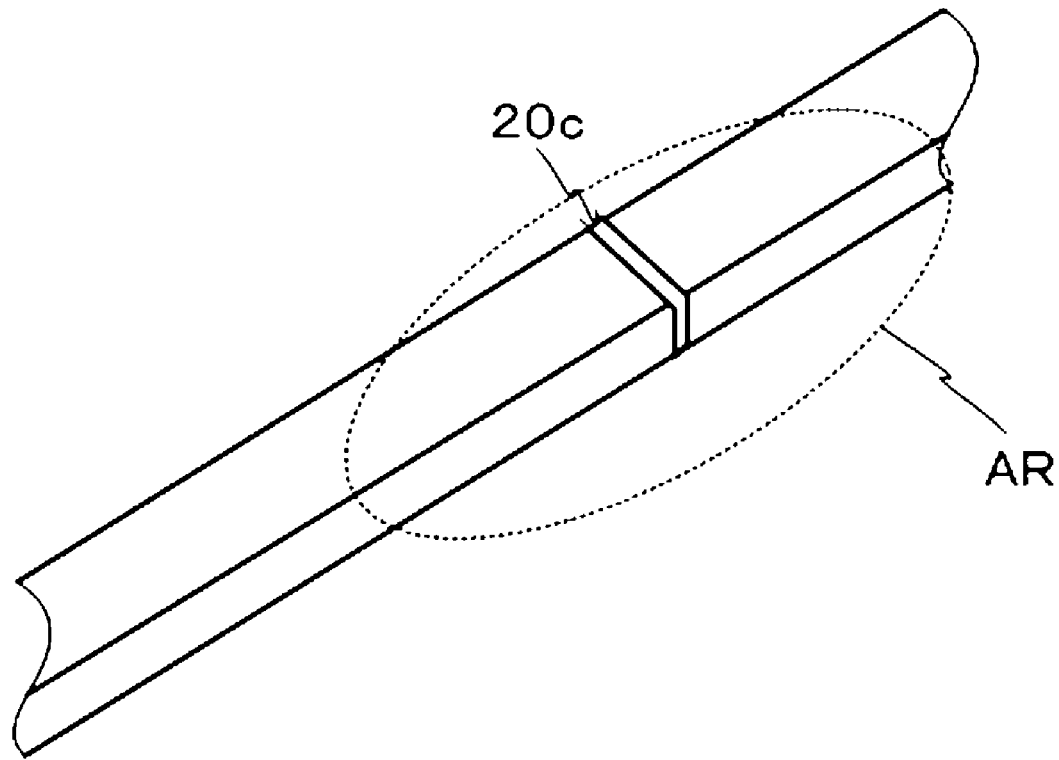
FIG. 2B is an enlarged view of a region serving as an area capable of communication in the information terminal apparatus of the first preferred embodiment of the present invention.

An information terminal apparatus 10 according to a first preferred embodiment of the present invention will be described below. FIG. 1 is a perspective view of the information terminal apparatus 10 in an open state. FIG. 2A is a perspective view of the information terminal apparatus 10 in a closed state. FIG. 2B is an enlarged view of a region AR serving as an area capable of communication. The information terminal apparatus 10 of this preferred embodiment preferably is a notebook (laptop) PC, and incorporates an NFC system as an HF-band RFID system, for example.

As illustrated in FIGS. 1 and 2, the information terminal apparatus 10 includes a display section 20 including a display shaped like a flat panel, and a body section 30 including input devices such as a keyboard 33 and a touchpad 34. The display section 20 includes a first metal housing (first conductive housing) 20a made of, for example, a magnesium alloy or an aluminum alloy. The body section 30 includes a second metal housing (second conductive housing) 30a made of, for example, a magnesium alloy or an aluminum alloy. The display section 20 and the body section 30 may include housings made of carbon fiber, instead of the first metal housing 20a and the second metal housing 30a, for example.

The first metal housing 20a includes a first principal surface S1, a second principal surface S2 opposite therefrom, and side surfaces that connect the first principal surface S1 and the second principal surface S2. The first metal housing 20a is a metal housing shaped like a rectangular or substantially rectangular flat plate in plan view. On the first principal surface S1, a first display 21 including liquid crystal display elements, organic EL (electroluminescence) elements, and so on is provided. On the second principal surface S2, a second display 22 including liquid crystal display elements, organic EL elements and so on is provided. The first display 21 is a non-touch-panel display, and the second display 22 is a touch-panel display.

The second metal housing 30a also includes a first principal surface SS1, a second principal surface SS2 opposite therefrom, and side surfaces that connect the first principal surface SS1 and the second principal surface SS2. The second metal housing 30a is a metal housing shaped like a rectangular or substantially rectangular flat plate in plan view. A keyboard 33 and a touchpad 34 are provided on the first principal surface SS1 of the second metal housing 30a. Although not illustrated, a USB (Universal Serial Bus) terminal, video input and output terminals, and so on are provided on the side surfaces of the second metal housing 30a.

The first metal housing 20a and the second metal housing 30a are connected by hinges 30c. This allows the first metal housing 20a and the second metal housing 30a to open and close.

Figure 3:
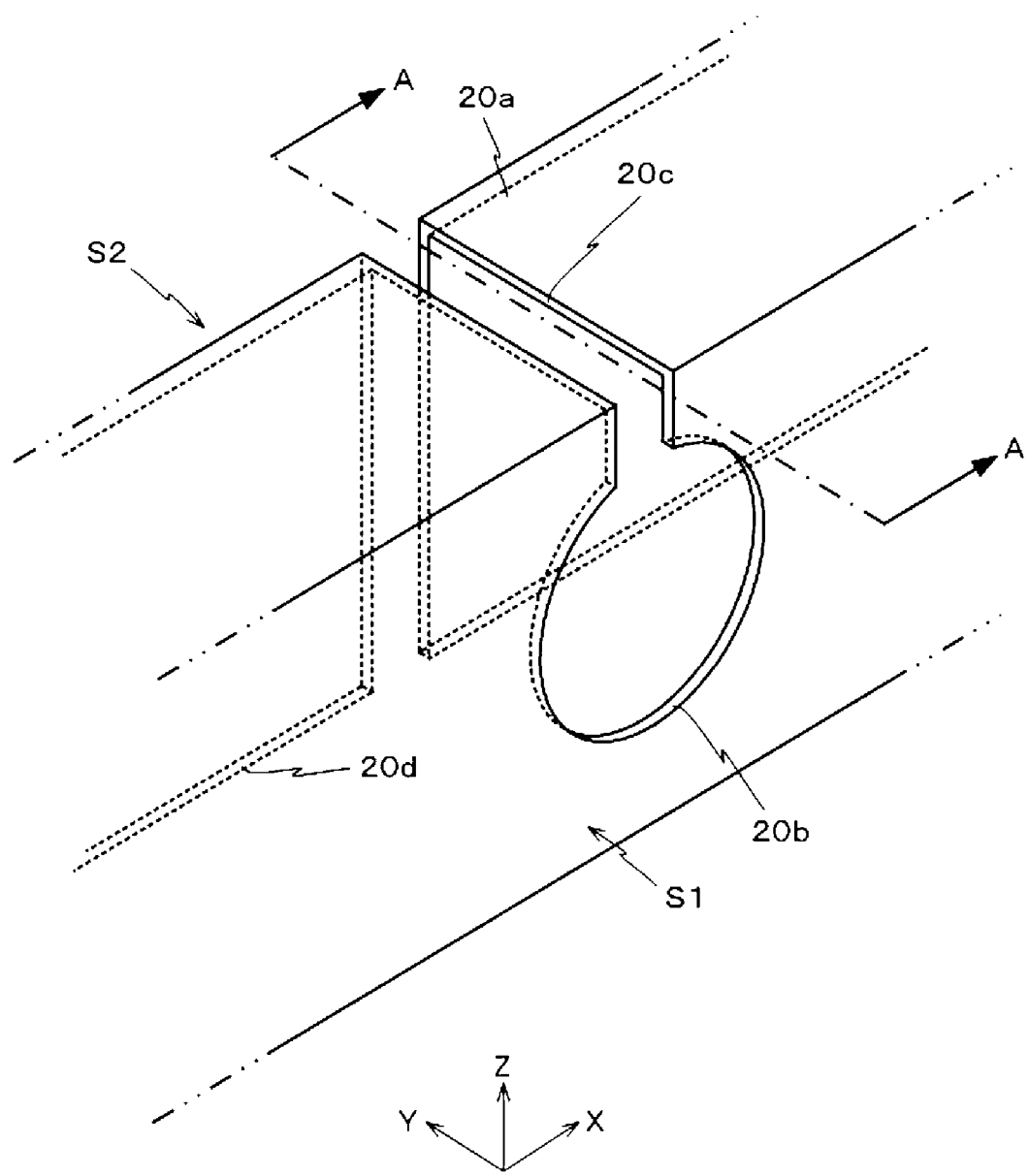
FIG. 3 is an enlarged view of an upper end portion of a first metal housing.

FIG. 3 is an enlarged view of an upper end portion of the first metal housing 20a. As illustrated in FIG. 3, a circular aperture (opening) 20b preferably formed by cutting out the first metal housing 20a is located in the center of an upper portion of the first principal surface S1 of the first metal housing 20a. The first metal housing 20a also includes a slit (opening) 20c extending from the aperture 20b to the second principal surface S2. The slit 20c is preferably formed by cutting out the first metal housing 20a from the aperture 20b to an aperture 20d from which the second display 22 is exposed. That is, the slit 20c extends from the first principal surface S1 to the second principal surface S2. One end of the slit 20c is connected to the aperture 20b, and the other end thereof is connected to the aperture 20d from which the second display 22 is exposed. The slit 20c is filled with an insulating material such as resin.

Figure 4:
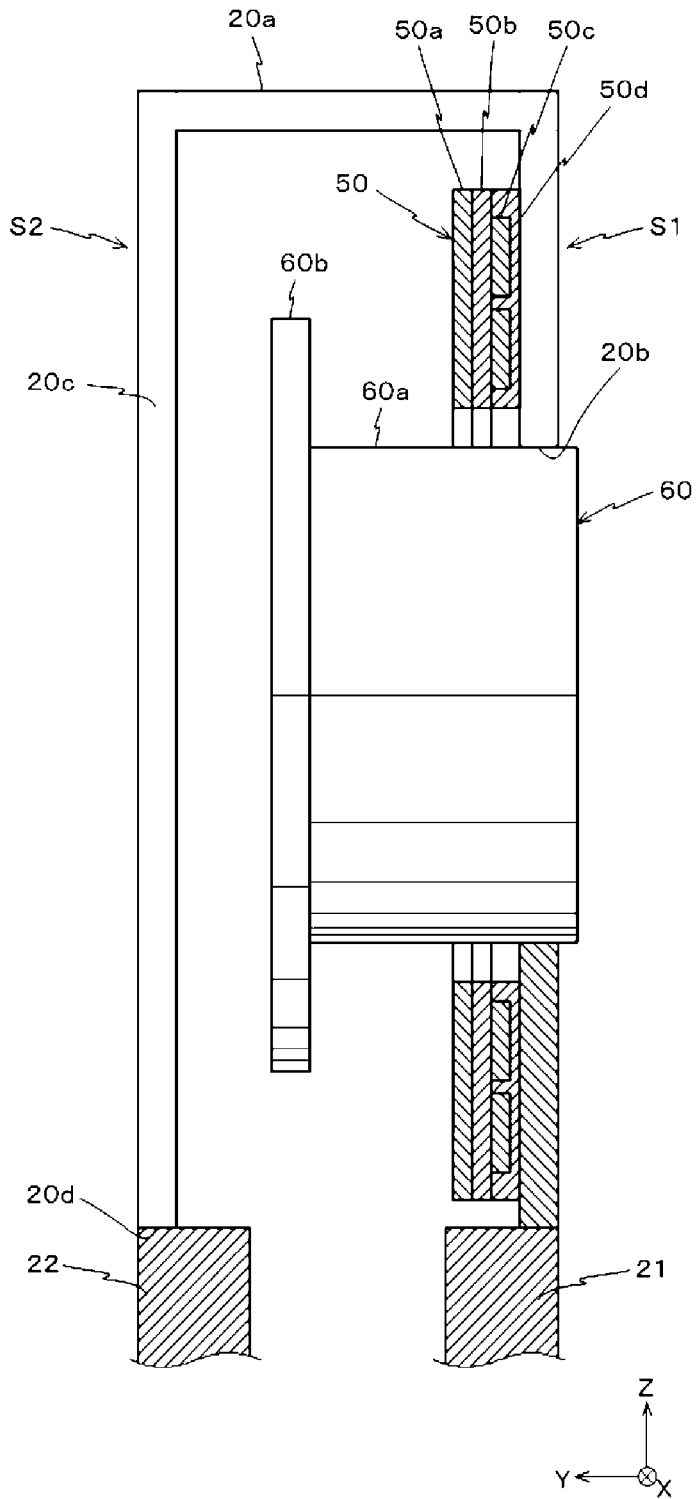
FIG. 4 illustrates a cross section of the first metal housing.

FIG. 4 illustrates a cross section taken along line A-A of FIG. 3. As illustrated in FIG. 4, a coil unit 50 and a camera module (camera unit) 60 are contained in an inner upper portion of the first metal housing 20a.

The coil unit 50 includes a flexible printed board 50b, and a magnetic sheet (magnetic member) 50a disposed along a Y-direction side of the flexible printed board 50b.

The flexible printed board 50b preferably is a circular or substantially circular member having a circular or substantially circular hole in its center. The inner diameter of the circular or substantially circular hole is slightly larger than the inner diameter of the aperture 20b provided in the first metal housing 20a. On a surface of the flexible printed board 50b opposite to the Y-direction side, a spiral power feeding coil 50c defined by a conductor pattern is provided. On this surface, a protective layer 50d made of resin or the like is also provided to cover the power feeding coil 50c.

The magnetic sheet 50a is a sheet preferably defined by, for example, a ferrite sintered body. The magnetic sheet 50a preferably has the same or substantially the same shape as that of the flexible printed board 50b. The magnetic sheet 50a is attached to the Y-axis direction side surface of the flexible printed board 50b.

Figure 5:
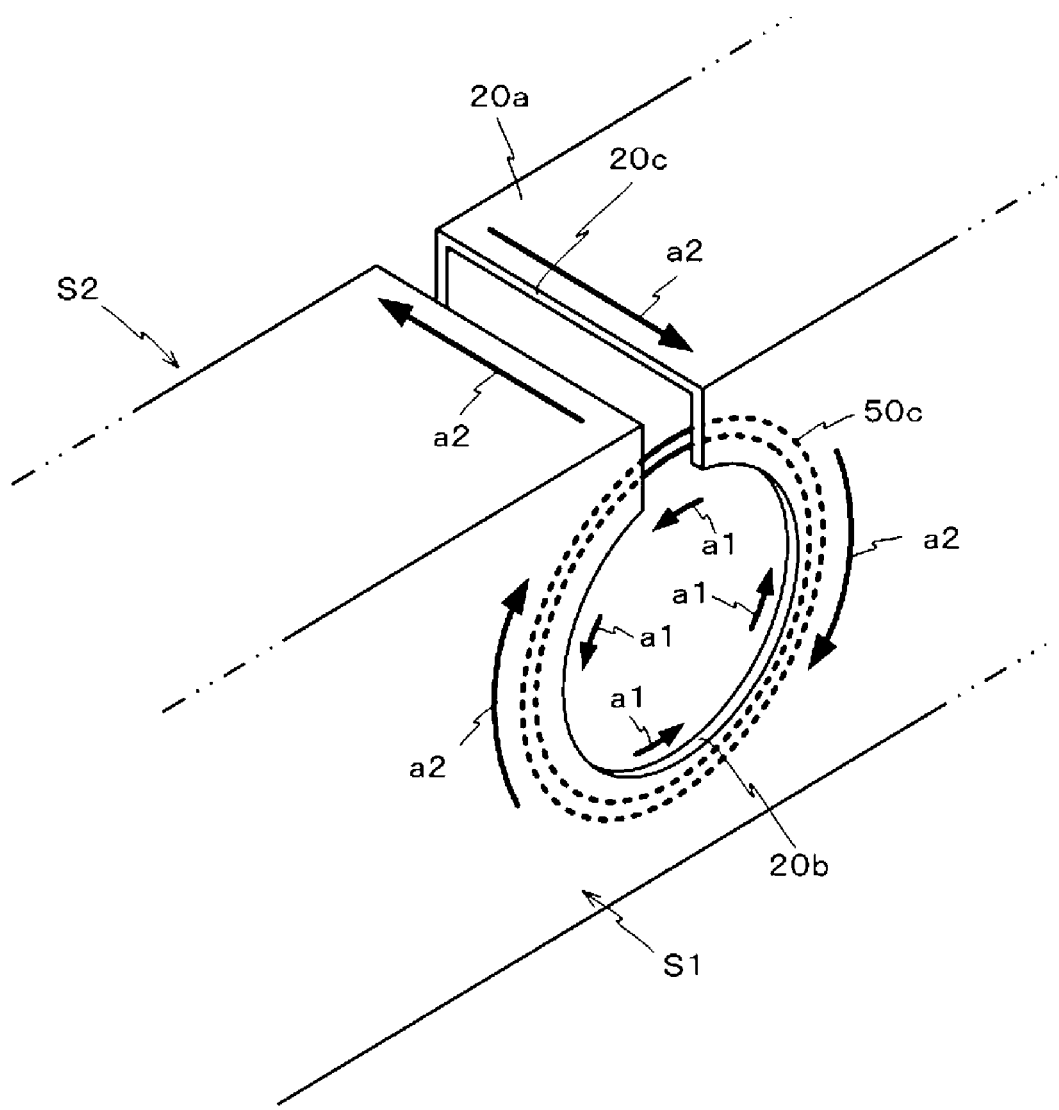
FIG. 5 illustrates the positional relationship between a power feeding coil and an aperture.

In the coil unit 50 having the above-structure, as illustrated in FIG. 5, the power feeding coil 50c preferably has a spiral shape. The power feeding coil 50c is attached on a surface of the first principal surface S1 of the first metal housing 20a. At this time, the power feeding coil 50c is positioned such that the center of an aperture (coil aperture) of the power feeding coil 50c coincides with the center of the aperture 20b provided in the first metal housing 20a. In this state, as illustrated in FIG. 5, most of the power feeding coil 50c is covered with the first principal surface S1 of the first metal housing 20a.

As illustrated in FIG. 4, the camera module 60 includes a cylindrical lens unit 60a that houses an optical system, and a substrate 60b on which an image pickup element and so on are mounted. The camera module 60 is supported in a state in which an end portion of the lens unit 60a opposite to a Y-axis direction side is inserted in the aperture 20b of the first metal housing 20a.

When current is supplied to the power feeding coil 50c of the coil unit 50, the power feeding coil 50c is magnetically coupled to the first metal housing 20a via the aperture 20b and the slit 20c. Thus, the first metal housing 20a defines and functions as a radiation element of the NFC system.

That is, when a signal current is supplied from a power feeding circuit to the power feeding coil 50c, an induced current is caused to flow around the aperture 20b and the slit 20c of the first metal housing 20a by an induced magnetic field generated by the signal current. That is, as illustrated in FIG. 5, when the current flows through the power feeding coil 50c, as shown by arrows a1, an induced current flowing, as shown by arrows a2, is guided to the first principal surface S1, the side surface, and the second principal surface S2 of the first metal housing 20a. Because of the induced current guided to these surfaces, the surroundings of the aperture 20b and the slit 20c of the first metal housing 20a function as a radiation element of a magnetic-field radiation type. Thus, a region AR shown by a dotted line in FIGS. 1, 2A, and 2B is an area capable of communication. For example, when a card-shaped tag is held over this region AR, non-contact communication is performed between a reader/writer provided in the information terminal apparatus 10 and the tag.

According to the above-described preferred embodiment, since the induced current of the power feeding coil 50c is guided to the first principal surface S1, the side surface, and the second principal surface S2 of the first metal housing 20a, communication of the NFC system is reliably performed, regardless of whether the display section 20 is open or closed. Further, communication of the NFC system is capable of being performed from any of the first principal surface S1, the second principal surface S2, and the side surface of the display section 20.

The power feeding coil 50c is preferably provided on an inner side of the first principal surface S1 of the first metal housing 20a, and the magnetic sheet 50a is provided on a back side thereof. That is, the induced magnetic field of the power feeding coil 50c does not directly reach the second principal surface S2.

Figures 6, 7:
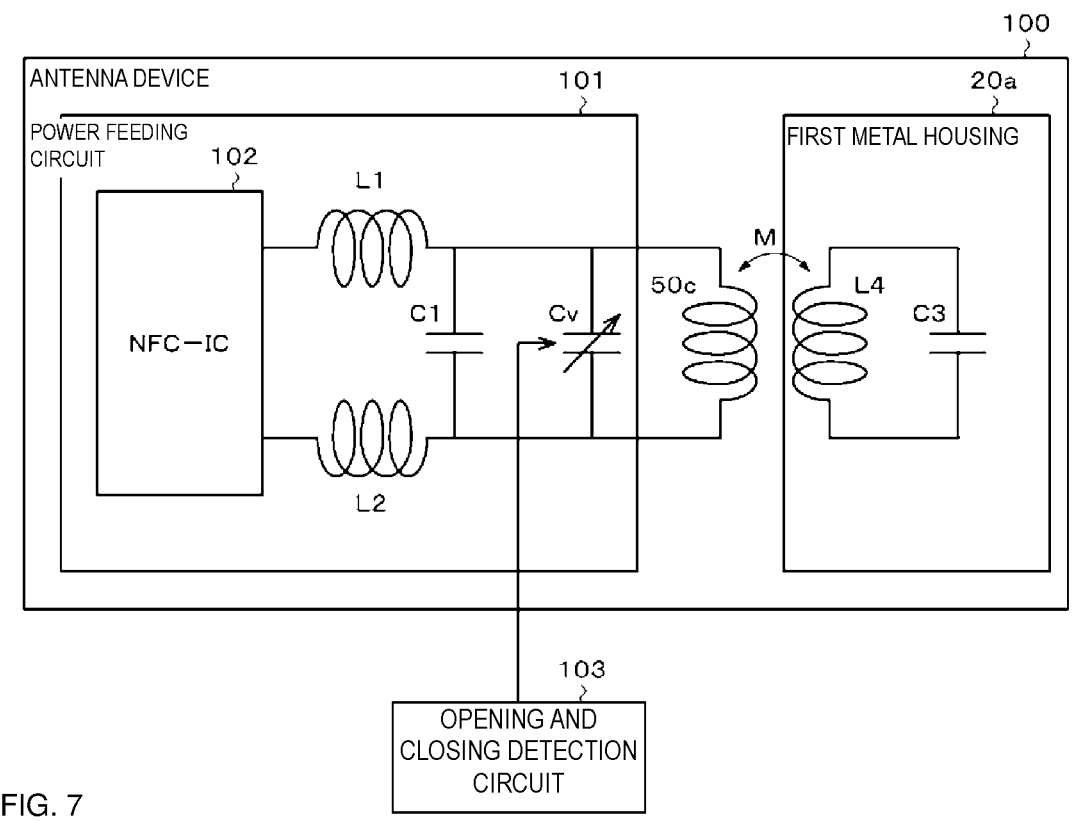
FIG. 6 illustrates an equivalent circuit of an antenna device.
FIG. 7 is a perspective view of an information terminal apparatus according to a second preferred embodiment of the present invention.

An antenna device for this NFC system preferably has an equivalent circuit illustrated in FIG. 6. The power feeding coil 50c is coupled to a power feeding circuit 101 for the NFC system. One end and the other end of the power feeding coil 50c are coupled to two terminals of an RFIC (Radio Frequency Integrated Circuit) chip (NFC-IC) 102 for the NFC system, respectively, via various elements. A variable-capacitance capacitor Cv is coupled in parallel to the power feeding coil 50c. The resonant frequency of the NFC system is set by a resonant circuit including the power feeding coil 50c and the variable-capacitance capacitor Cv. The resonant frequency of the resonant circuit is set to be equal or substantially equal to the carrier frequency (e.g., about 13.56 MHz) of the NFC system.

The power feeding circuit 101 includes a filter circuit including inductances L1 and L2 and a capacitor C1. This filter circuit is preferably configured as a low pass filter. For this reason, the filter circuit attenuates harmonic noise from the RFIC chip (NFC-IC) 102.

The first metal housing 20a includes an inductance L4 that depends on the peripheral length of the slit 20c, and a capacitor C3 provided between opposed sides of the slit 20c. The power feeding coil 50c is magnetically coupled to the inductance L4 of the first metal housing 20a. A resonant circuit defined by the inductance L4 and the capacitor C3 preferably has a resonant frequency close to the carrier frequency of the NFC system, but the resonant frequency may be higher or lower than the carrier frequency. The capacitor C3 may be structured by adding a capacitative element such as a chip capacitor, for example.

An opening and closing detection circuit 103 configured to detect opening and closing of the display section 20 is coupled to the variable-capacitance capacitor Cv. That is, in the information terminal apparatus 10 of this preferred embodiment, both the first metal housing 20a and the second metal housing 30a preferably are metal housings. For this reason, the resonant frequency is likely to be higher when the display section 20 (first metal housing 20a) is closed than when the display section is open. For this reason, the opening and closing detection circuit 103 detects an opening and closing state of the display section 20, and feeds back the detection to the variable-capacitance capacitor Cv. For example, when the display section 20 is closed, the opening and closing detection circuit 103 executes frequency control, for example, increases the capacitance of the variable-capacitance capacitor Cv.

Second Preferred Embodiment

As illustrated in FIG. 7, an information terminal apparatus 10A according to this preferred embodiment preferably is a notebook PC. On a second principal surface S2 of a first metal housing 20a of the information terminal apparatus 10A, a non-metal portion (non-metal member) 25 is provided instead of the second display 22. The non-metal portion 25 is a resin housing. Other principal elements have structures similar to those adopted in the information terminal device 10 of the first preferred embodiment. On an inner side of the non-metal portion 25, antennas for a cellular phone and a wireless LAN preferably are disposed.

A slit 20c extends from a first principal surface S1 to a side surface, and further to the second principal surface S2. For example, the slit 20c extends from an aperture 20b to the non-metal portion 25. In this case, an end portion of the slit 20c on the second principal surface S2 reaches the non-metal portion 25. Therefore, even in a state in which a display section 20 (first metal housing 20a) is closed, communication of an NFC system is reliably performed. Further, the NFC system can be used from any of the first principal surface S1, the second principal surface S2, and the side surface of the first metal housing 20a.

Third Preferred Embodiment

Figure 8:
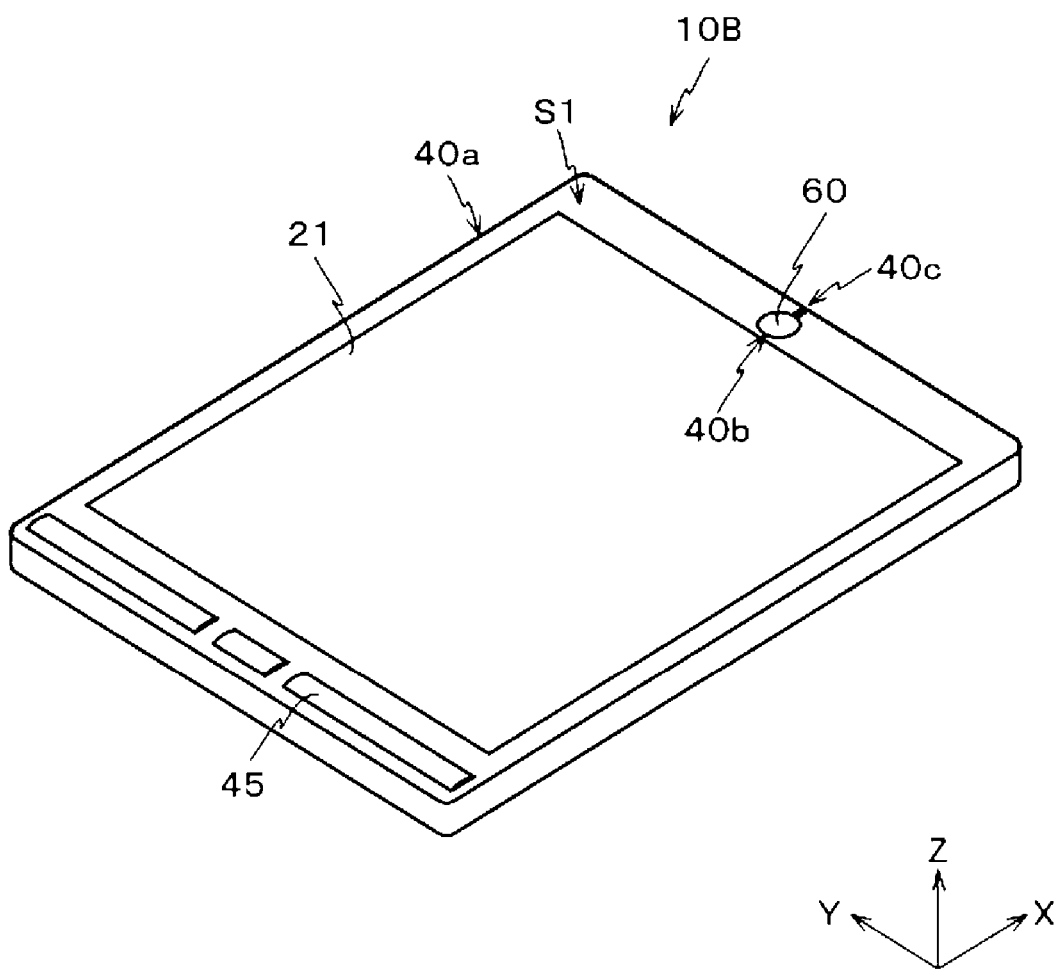
FIG. 8 is a perspective view of an information terminal apparatus according to a third preferred embodiment of the present invention.
Figure 9:
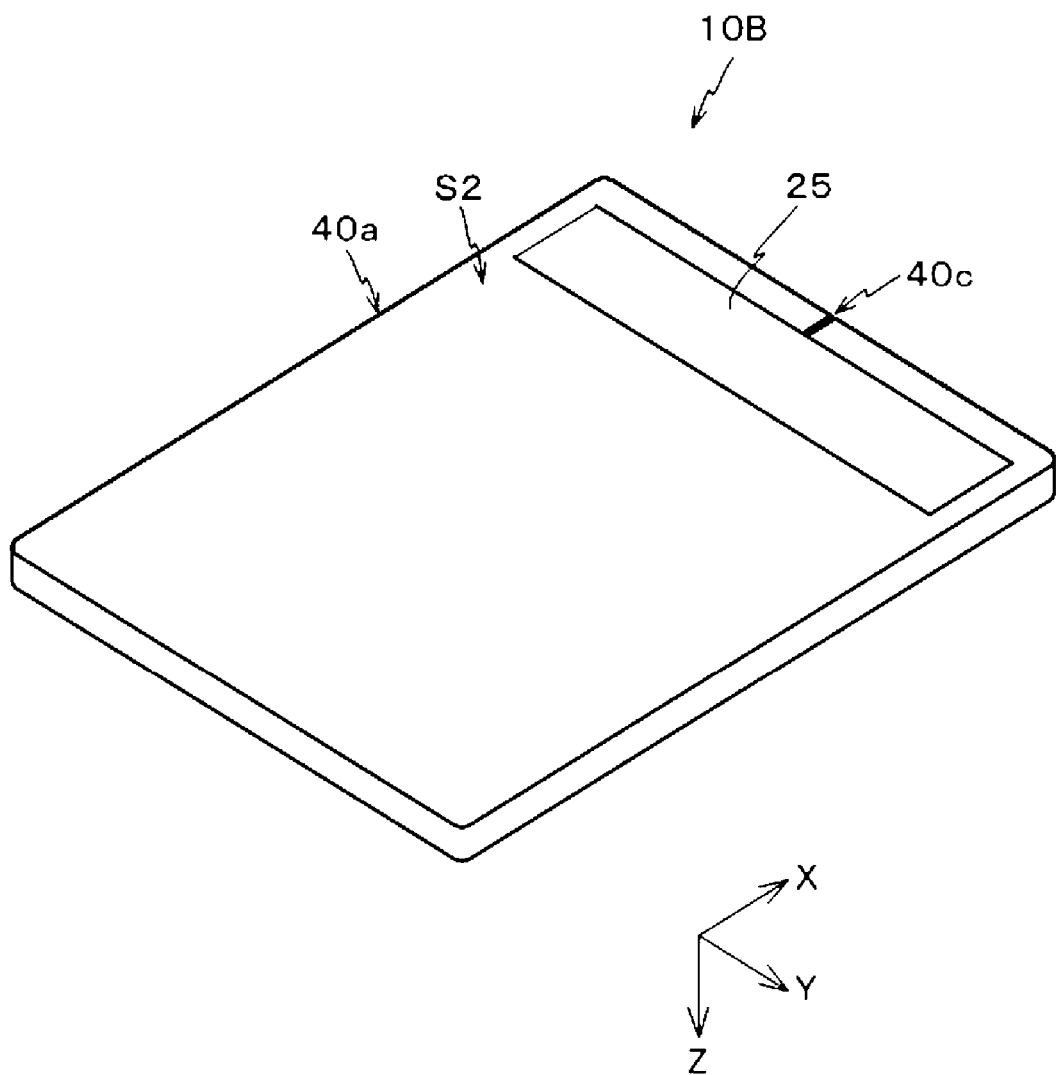
FIG. 9 illustrates a non-metal portion provided in the information terminal apparatus.

As illustrated in FIG. 8, an information terminal apparatus 10B according to this preferred embodiment preferably is a tablet terminal. A first principal surface S1 of a first metal housing 40a of the information terminal apparatus 10B is provided with a first display 21 of a touch panel type and of a flat panel type, a switch unit 45, and so on. As illustrated in FIG. 9, a non-metal portion 25 is provided on a second principal surface S2 of the first metal housing 40a. The non-metal portion 25 is a resin housing. On an inner side of the non-metal portion 25, antennas for a cellular phone and a wireless LAN (Local Area Network) are preferably disposed.

As illustrated in FIG. 8, an aperture (opening) 40b is provided in the center of an upper end portion of the first metal housing 40a (X-axis direction end portion of the first metal housing 40a). Further, as illustrated in FIGS. 8 and 9, in the center of the upper end portion of the first metal housing 40a, a slit (opening) 40c extends from the aperture 40b to the second principal surface S2 via a side surface. As illustrated in FIG. 9, an end portion of the slit 40c on the second principal surface S2 reaches the non-metal portion 25. As illustrated in FIG. 8, a camera module 60 is attached at the aperture 40b. Hence, an NFC system can be used from any of the first principal surface S1, the second principal surface S2, and the side surface of the metal housing 40a.

Fourth Preferred Embodiment

Figure 10:
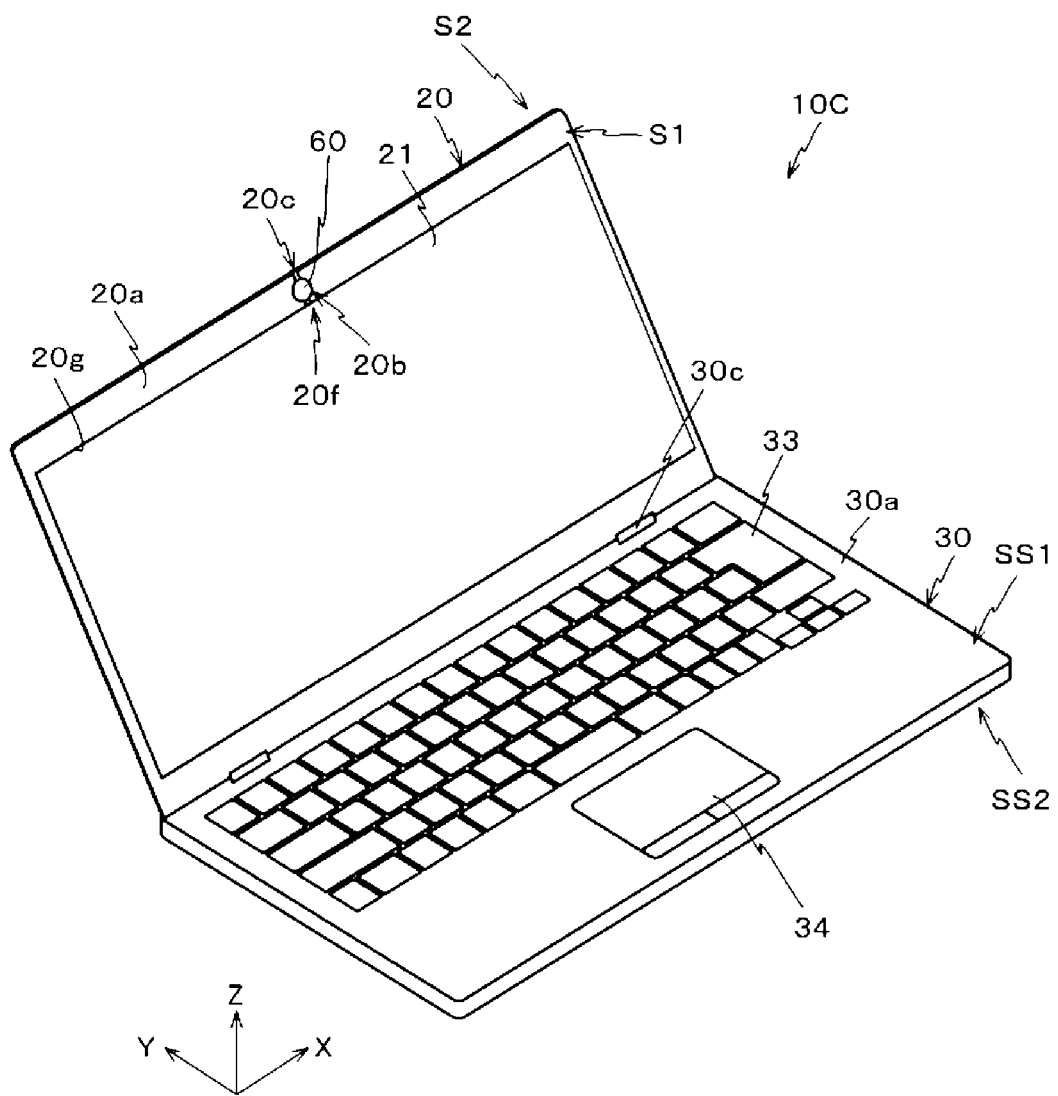
FIG. 10 is a perspective view of an information terminal apparatus according to a fourth preferred embodiment of the present invention.
Figure 11:
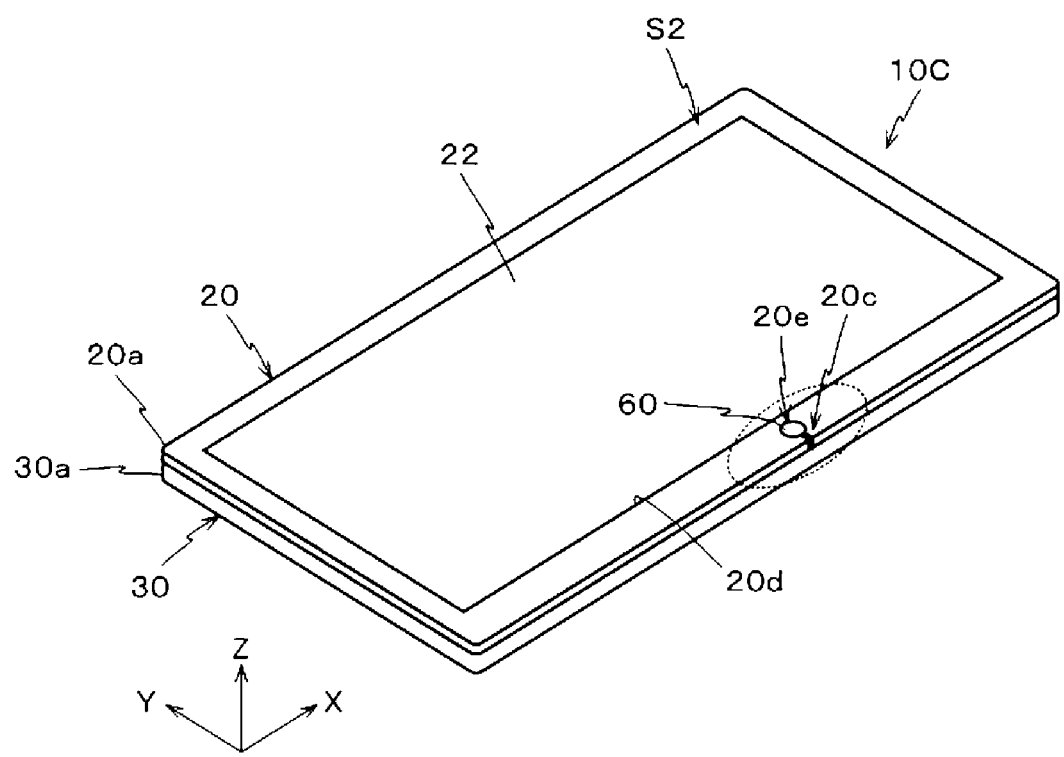
FIG. 11 is a perspective view of the information terminal apparatus according to the fourth preferred embodiment of the present invention.

FIG. 10 is a perspective view of an information terminal apparatus 100 according to this preferred embodiment. FIG. 11 is a perspective view of the information terminal apparatus 100 in a closed state. The information terminal apparatus 100 preferably is a notebook personal computer including a display section 20 including a first metal housing 20a and a body section 30 including a second metal housing 30a. The first metal housing 20a and the second metal housing 30a are connected by hinges 30c such as to be turnable about a shaft parallel to the X-axis. This allows a first principal surface SS1 of the body section 30 and a first principal surface S1 of the display section 20 in the information terminal apparatus 10C to be closed together.

As illustrated in FIGS. 10 and 11, the display section includes a first metal housing 20a, and a first display 21 and a second display 22 contained in the first metal housing 20a.

The first metal housing 20a is preferably made of aluminum or stainless steel. The first display 21 and the second display 22 preferably are liquid crystal displays whose longitudinal direction is the X-axis direction. The first display 21 is exposed from an aperture 20g provided in the first principal surface S1 of the first metal housing 20a, and the second display 22 is exposed from an aperture 20d provided in a second principal surface S2.

Figure 12:
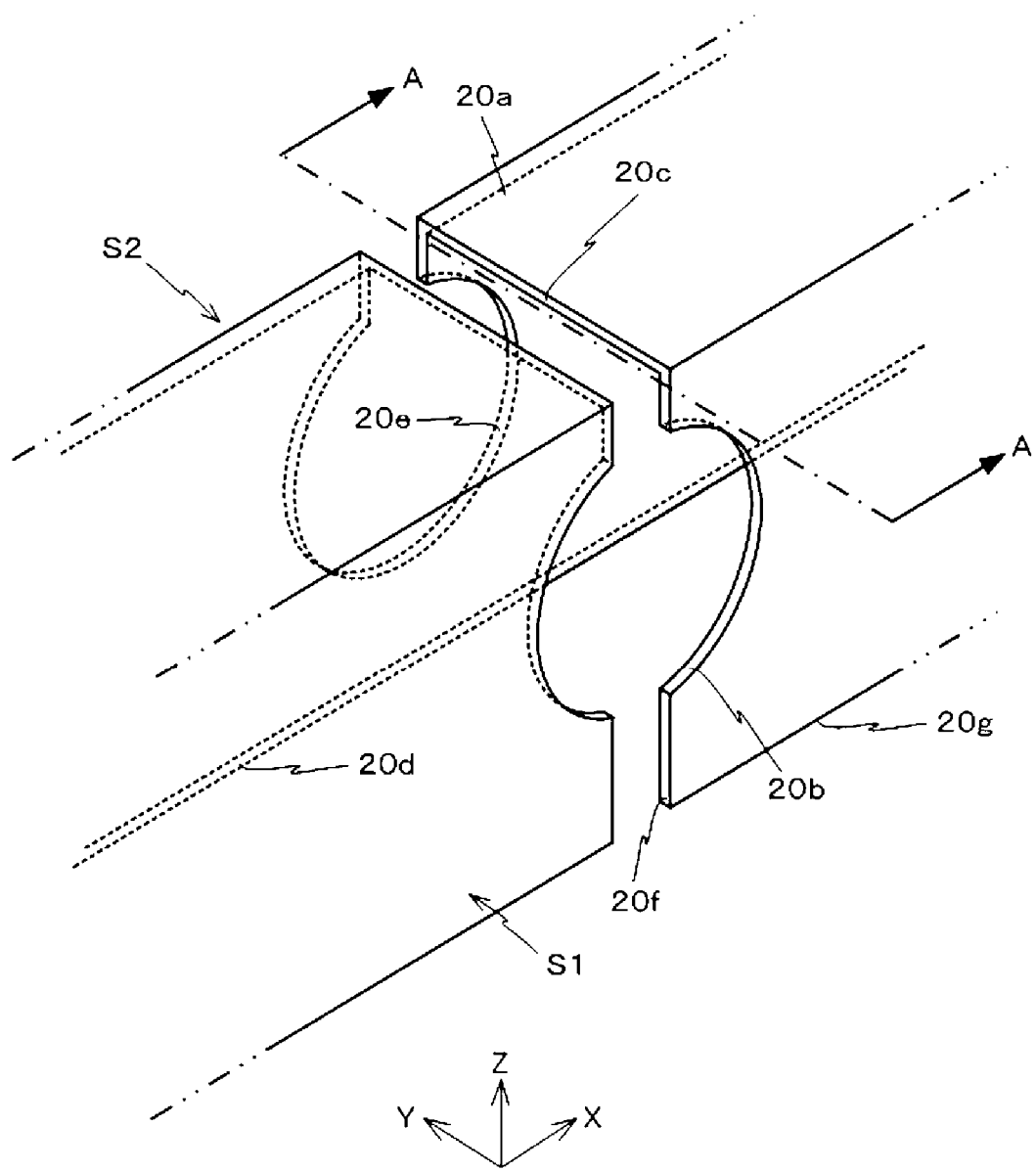
FIG. 12 is an enlarged view of an upper end portion of a first metal housing.

FIG. 12 is an enlarged view of an upper end portion of the first metal housing 20a. As illustrated in FIG. 12, a circular aperture 20b preferably formed by cutting out the first metal housing 20a is located in the center of an upper portion of the first principal surface S1 of the first metal housing 20a. A circular or substantially circular aperture (opening) 20e similarly formed preferably by cutting out the first metal housing 20a is also located in the center of an upper portion of the second principal surface S2 of the first metal housing 20a. The centers in a ZX-plane of the aperture 20b and the aperture 20e coincide with each other, and the inner diameters of the apertures 20b and 20e are equal or substantially equal to each other. The first metal housing 20a also includes a slit 20c extending from the aperture 20b to the aperture 20e, and a slit (opening) 20f extending from the aperture 20b to the aperture 20g.

Figure 13:
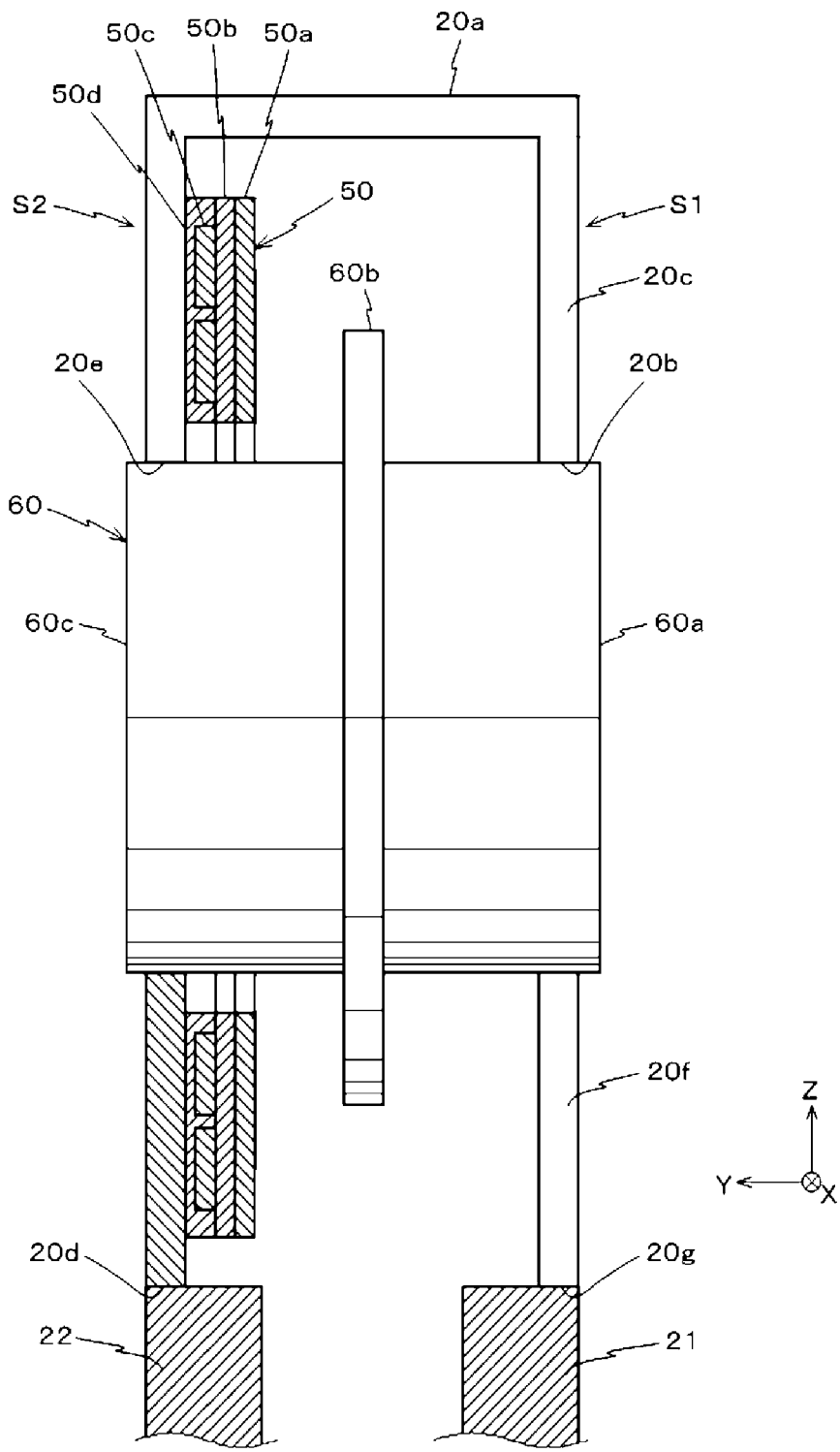
FIG. 13 illustrates a cross section of the first metal housing.

FIG. 13 illustrates a cross section taken along line A-A of FIG. 12. As illustrated in FIG. 13, a coil unit 50 and a camera module 60 are contained in an upper inner portion of the first metal housing 20a.

The coil unit 50 includes a flexible printed board 50b, and a magnetic sheet 50a disposed on a side of the flexible printed board 50b opposite to a Y-axis direction side.

The flexible printed board 50b is a circular or substantially circular member having a circular or substantially circular hole in its center. The inner diameter of the circular or substantially circular hole preferably is slightly larger than the inner diameter of the aperture 20e provided in the first metal housing 20a. A spiral power feeding coil 50c defined by a conductor pattern is provided on a Y-axis direction side surface of the flexible printed board 50b. On this surface, a protective layer 50d made of resin or the like is also provided to cover the power feeding coil 50c.

The magnetic sheet 50a preferably is a sheet defined by, for example, a ferrite sintered body. The magnetic sheet 50a preferably the same shape or substantially the same shape as that of the flexible printed board 50b. The magnetic sheet 50a is attached on a surface of the flexible printed board 50b opposite to the Y-axis direction side surface. The power feeding coil 50c is provided on the second principal surface S2 in an outer side portion of the first metal housing 20a. On a back side of the power feeding coil 50c, the magnetic sheet 50a is provided. That is, an induced magnetic field of the power feeding coil 50c does not directly reach the first principal surface S1.

Figure 14:
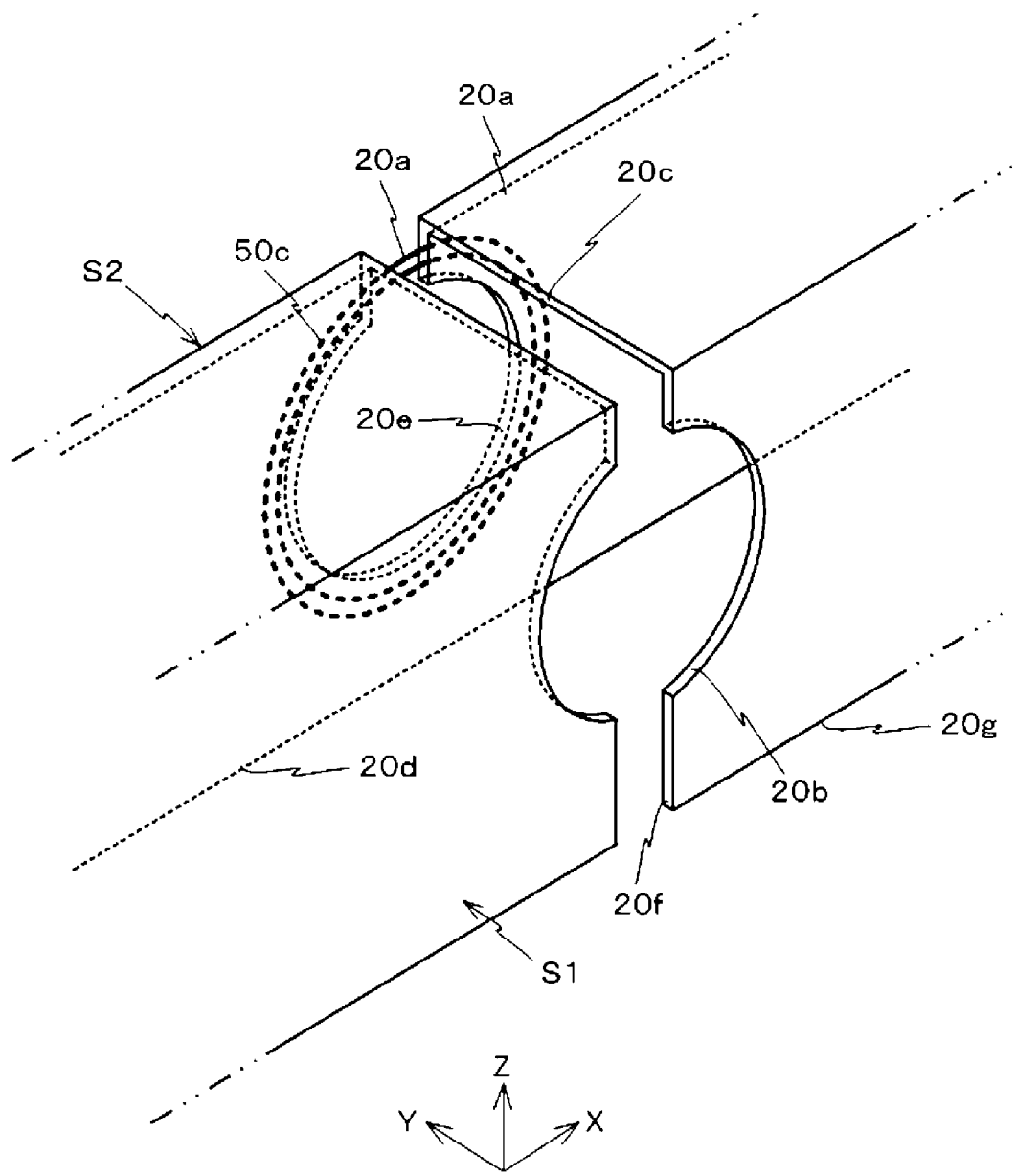
FIG. 14 illustrates the positional relationship between a power feeding coil and an aperture.

In the coil unit 50 having the above-structure, as illustrated in FIG. 14, the power feeding coil 50c preferably has a spiral shape. The power feeding coil 50c is attached to a surface of the first metal housing 20a on a side of the second principal surface S2. At this time, the power feeding coil 50c is positioned such that the center of an aperture of the power feeding coil 50c nearly coincides with the center of the aperture 20e provided in the first metal housing 20a. In this state, as illustrated in FIG. 14, most of the power feeding coil 50c is covered with the second principal surface S2 of the first metal housing 20a.

As illustrated in FIG. 13, the camera module 60 includes cylindrical lens units 60a and 60c that house optical systems, and a substrate 60b on which an image pickup element and so on are mounted. The lens unit 60a is disposed on a surface of the substrate 60b facing the first principal surface S1 in FIG. 13, and is used to photograph an object located on the side of the first principal surface S1. The lens unit 60c is disposed on a surface of the substrate 60b facing the second principal surface S2, and is used to photograph an object located on the side of the second principal side S2.

The camera module 60 having the above-described structure is supported in a state in which the lens unit 60*a* is inserted in the aperture 20*b* of the first metal housing 20*a* and the lens unit 60*c* is inserted in the aperture 20*e*.

Returning to FIG. 10, the body section 30 includes a second metal housing 30*a* made of metal. The body section 30 also includes a keyboard 33 and a touchpad 34 exposed from the first principal surface SS1 of the second metal housing 30*a*. The keyboard 33 includes a plurality of key tops, and switches to be operated by the press of the key tops. The keyboard 33 is horizontally supported within the second metal housing 30*a*.

Figure 15:
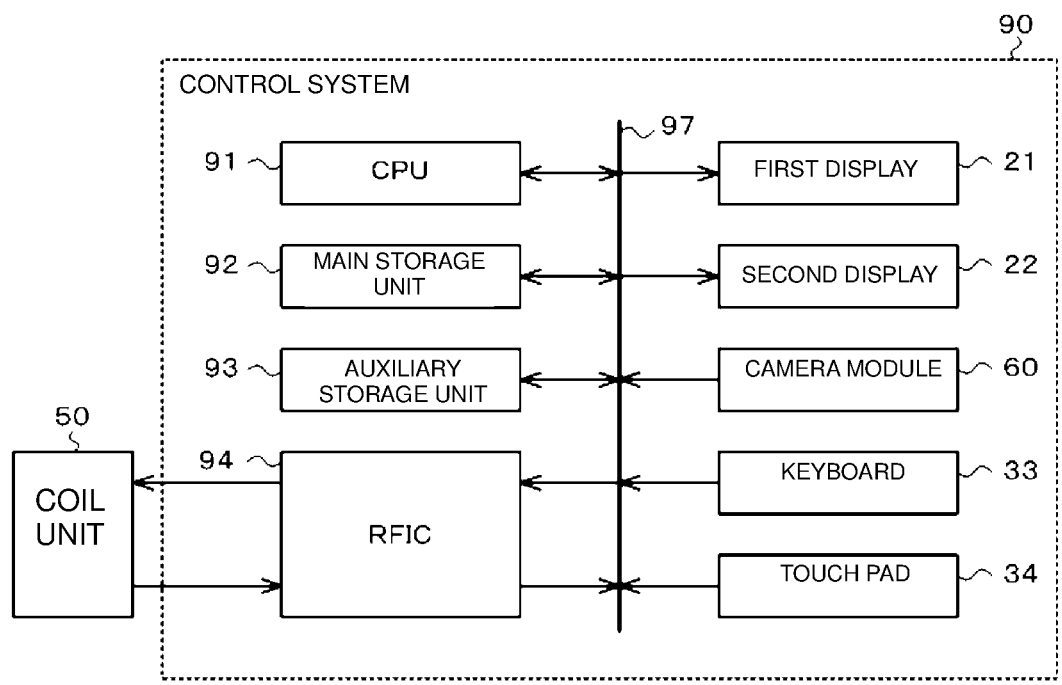
FIG. 15 is a block diagram of a control system in the information terminal apparatus.

FIG. 15 is a block diagram of a control system 90 of the information terminal apparatus 10C. The control system 90 includes a CPU (Central Processing Unit) 91, a main storage unit 92, an auxiliary storage unit 93, and an RFIC 94. These constituent elements are mounted on an unillustrated motherboard contained in the body section 30. The control system 90 further includes the first display 21, the second display 22, and the camera module 60.

The CPU 91 reads out a program stored in the auxiliary storage unit 93 according to a command from the user. Then, the CPU 91 executes processing in accordance with instructions input through the keyboard 33 and the touchpad 34.

The main storage unit 92 includes a RAM (Random Access Memory) and so on, and is used as a work area of the CPU 91.

The auxiliary storage unit 93 includes a nonvolatile memory such as a ROM (Read Only Memory) or a semiconductor memory. The auxiliary storage unit 93 stores programs to be executed by the CPU 91 and various parameters including a parameter to perform near field wireless communication.

The RFIC 94 outputs a voltage signal modulated on the basis of transmitted information to the coil unit 50 according to instructions from the CPU 91. Also, the RFIC 94 outputs, to the CPU 91, a demodulated signal generated by demodulating an induced current induced to the coil unit 50.

The constituent elements of the control system 90 are mutually coupled by a system bus 97.

Next, a description will be given of a non-limiting example of a procedure for performing near field communication (NFC) using the information terminal apparatus 10C. To perform the near field communication using the information terminal apparatus 10C, the user first starts an application necessary for communication, which is installed in the information terminal apparatus 10C beforehand. Current is thereby supplied to the power feeding coil 50*c* that constitutes the coil unit 50.

When the current flows through the power feeding coil 50*c*, magnetic flux from the current passes through the aperture 20*e*. When the magnetic flux passes through the aperture 20*e*, an induced current is generated around the aperture 20*e*. As shown by an imaginary line of FIG. 16, the induced current generated around the aperture 20*e* is caused by an edge effect to flow along outer edges of the apertures 20*b* and 20*e* and the slits 20*c* and 20*f*.

Figure 16:
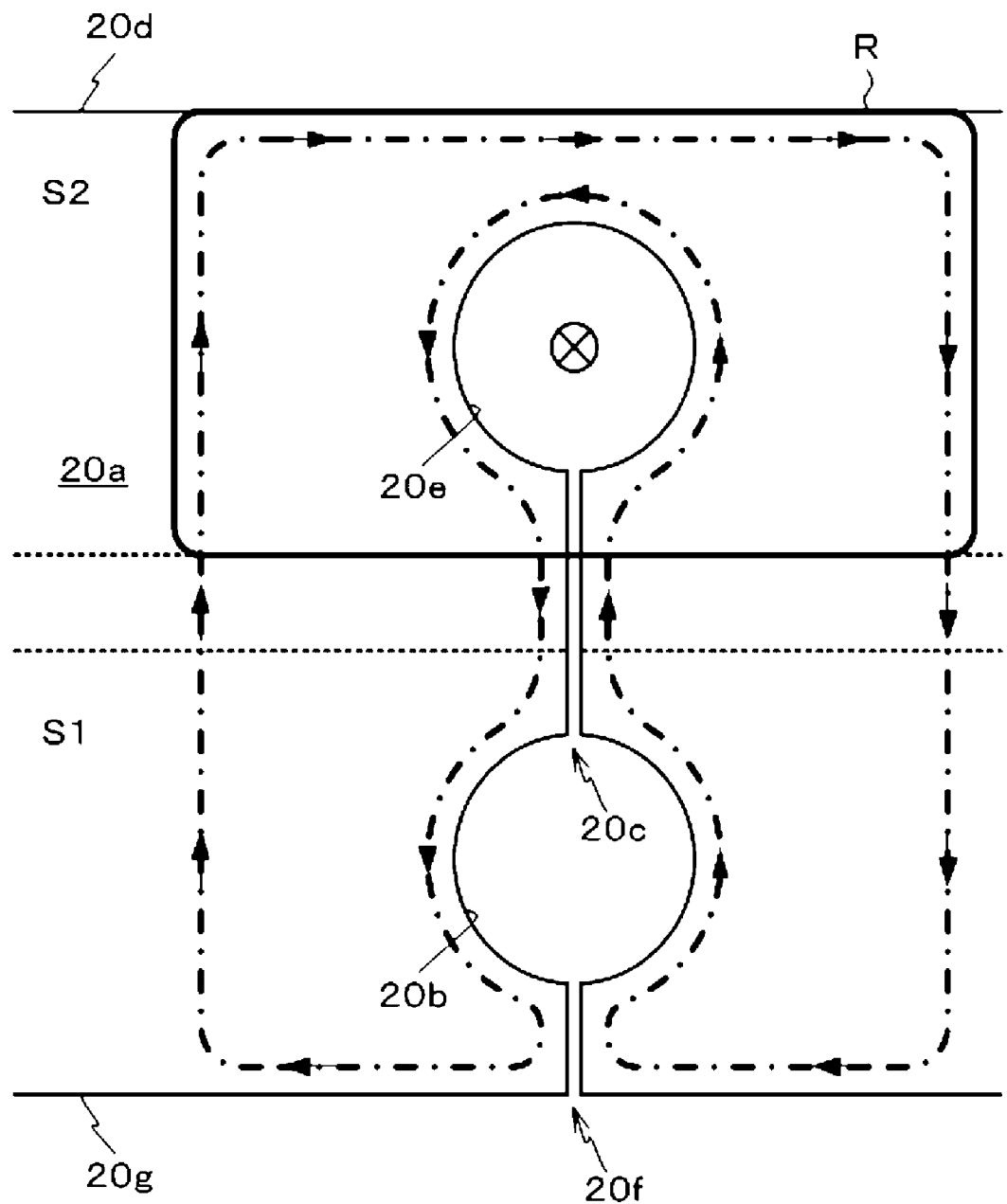
FIG. 16 explains induced current generated around the apertures.

The induced current flowing near the aperture 20*e* and the slits 20*c* and 20*f* flows in a direction to cancel the magnetic flux generated by the power feeding coil 50*c*, that is, in a direction opposite to the direction of the current flowing through the power feeding coil 50*c*. In contrast, the induced current flowing apart from the aperture 20*e* flows in the same direction as the direction of the current flowing through the power feeding coil 50*c*. For this reason, although there is an influence of the induced current flowing near the aperture 20*e*, as illustrated in FIG. 16, an illustrated region R is ensured by interaction between the induced current flowing apart from the aperture 20*e* of the second principal surface S2 and the current flowing through the power feeding coil 50*c*. This region R is defined by the current flowing in a portion of the second principal surface S2 apart from the aperture 20*e*, and functions as a radiation plate. Thus, predetermined information is transmitted via the power feeding coil 50*c* and the first metal housing 20*a*.

Figure 17:
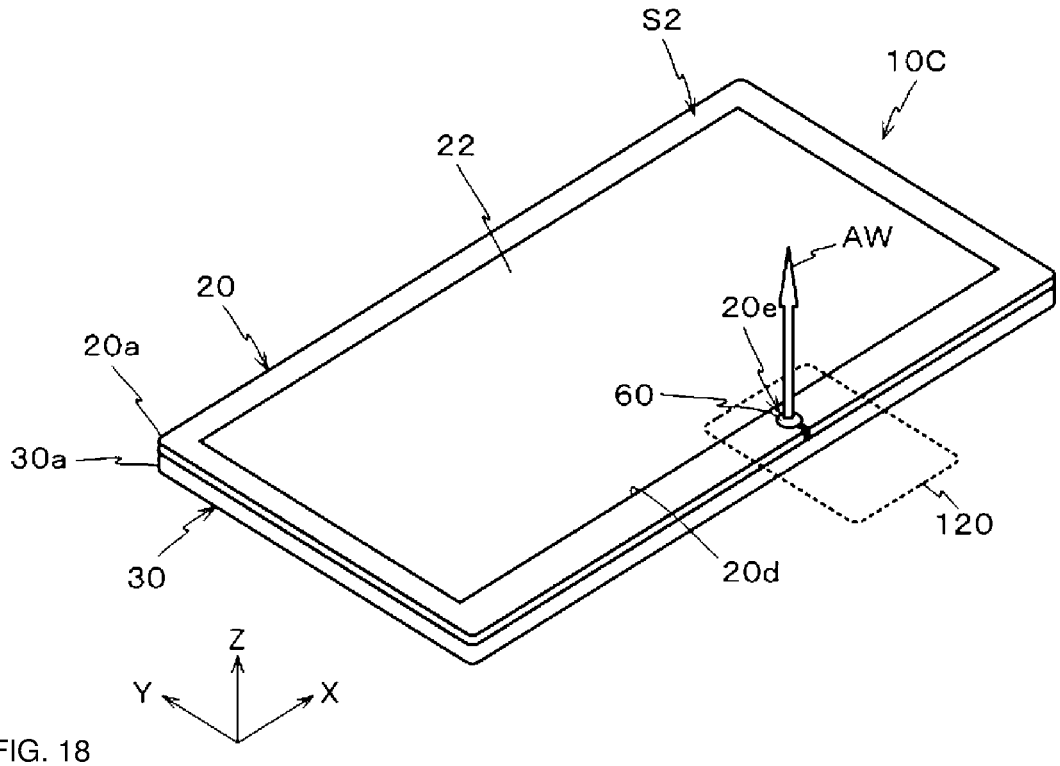
FIG. 17 illustrates a communication manner between the information terminal apparatus and a communication target.

For example, as illustrated in FIG. 17, when the user holds a communication target 120, such as a smartphone, near the aperture 20*e*, from which the camera module 60 is exposed, in this state, communication is performed between the information terminal apparatus 10C and the communication target 120.

When information is transmitted to the communication target 120, magnetic flux generated by the power feeding coil 50*c* penetrates the communication target 120, as shown by arrow AW of FIG. 17. The communication target 120 receives the information transmitted from the information terminal apparatus 10C by demodulating current induced by the magnetic flux.

When the information terminal apparatus 10C receives information from the communication target 120, magnetic flux generated by the communication target 120 penetrates the aperture 20*e* of the first metal housing 20*a*. In this case, an induced current shown by the imaginary line of FIG. 16 is generated in the first metal housing 20*a*. Then, the magnetic flux intensified by the induced current passes through the aperture of the power feeding coil 50*c* of the coil unit 50. Thus, current modulated on the basis of the information transmitted from the communication target 120 is induced to the power feeding coil 50*c*. This induced current is demodulated by the RFIC 94, and is output to the CPU 91. This allows the information terminal apparatus 10C to receive the information transmitted from the communication target 120.

As described above, in this preferred embodiment, when current is supplied to the power feeding coil 50*c* of the coil unit 50, magnetic flux generated by the power feeding coil 50*c* passes through the aperture 20*e* of the first metal housing 20*a*. Thus, as illustrated in FIG. 16, induced current is generated in the first metal housing 20*a*, and the power feeding coil 50*c* and the first metal housing 20*a* are coupled magnetically. The first metal housing 20*a* functions as a radiation element of the NFC system.

For this reason, for example as illustrated in FIG. 17, when the user holds the communication target 120, such as a smartphone, near the aperture 20*e* from which the camera module is exposed, communication is performed between the information terminal apparatus 10C and the communication target 120.

In this preferred embodiment, as illustrated in FIG. 13, the coil unit 50 preferably is provided on the second principal surface S2 of the first metal housing 20*a*. Therefore, even when the body section 30 and the display section 20 of the information terminal apparatus 10C are closed together and the first principal surface S1 of the first metal housing 20*a* and the first principal surface SS1 of the second metal housing 30*a* are placed close to each other, as illustrated in FIG. 11, the inductance of the power feeding coil 50*c* that constitutes the coil unit 50 rarely changes. For this reason, communication between the information terminal apparatus 10C and the communication target 120 is maintained stably.

As illustrated in FIG. 13, in the coil unit 50 of this preferred embodiment, the magnetic sheet 50*a* is disposed on the side of the power feeding coil 50*c* facing the first principal surface S1. For this reason, even when the body section 30 and the display section 20 of the information terminal apparatus 10C are closed together and the first principal surface S1 of the first metal housing 20*a* and the first principal surface SS1 of the second metal housing 30*a* are placed close to each other, the change in inductance of the power feeding coil 50*c* of the coil unit 50 is significantly reduced or prevented. As a result, communication between the information terminal apparatus 100 and the communication target 120 is maintained stably.

Figure 18:
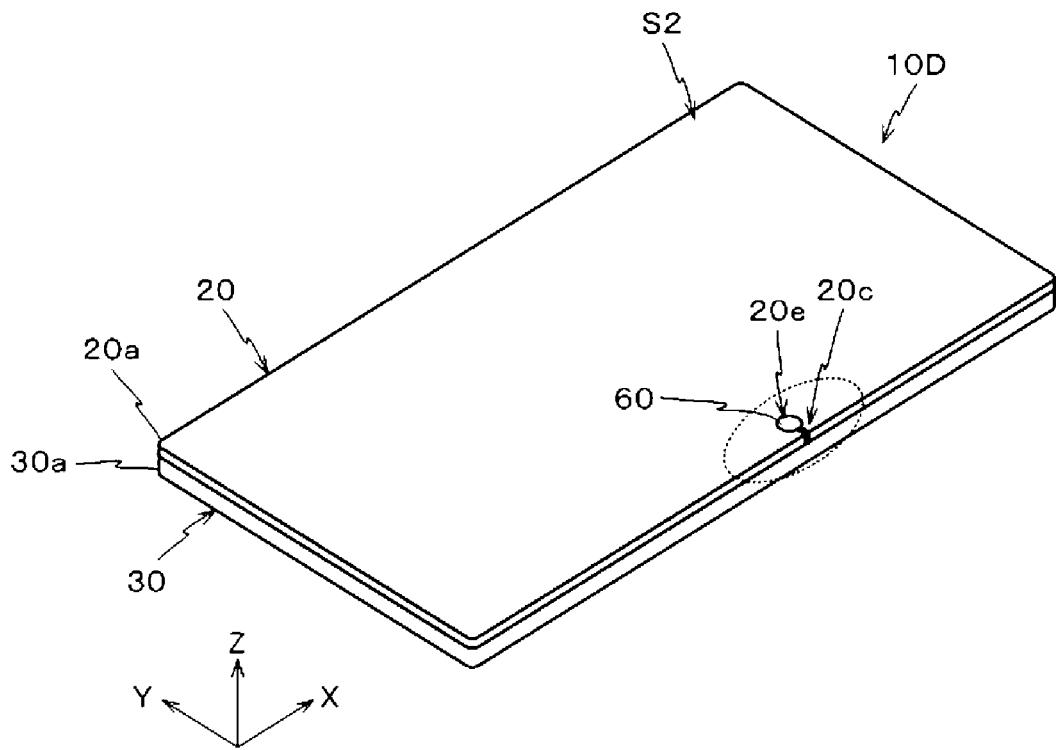
FIG. 18 is a perspective view of an information terminal apparatus according to a modification of a preferred embodiment of the present invention.

In the above-described preferred embodiment, as illustrated in FIG. 11, the display section 20 includes the first display 21 and the second display 22. Alternatively, the second display 22 on the second principal surface S2 of the first metal housing 20*a* may be omitted, as in an information terminal apparatus 10D illustrated in FIG. 18. In this case, the power feeding coil 50*c* and the first metal housing 20*a* are also magnetically coupled, and the first metal housing 20*a* functions as a radiation element of an NFC system.

Other Preferred Embodiments

While the specific preferred embodiments of the present invention have been described above, the present invention is not limited to these preferred embodiments.

For example, in the above-described preferred embodiments, the coil unit 50 preferably is a planar coil, as illustrated in FIGS. 4 and 13. Alternatively, as illustrated in FIGS. 19 and 20, a chip coil 70 including a magnetic core 70*a* shaped like a rectangular or substantially rectangular parallelepiped and a conductive wire 70*b* wound around the magnetic core 70*a* may be used as a power feeding coil.

Figure 19:
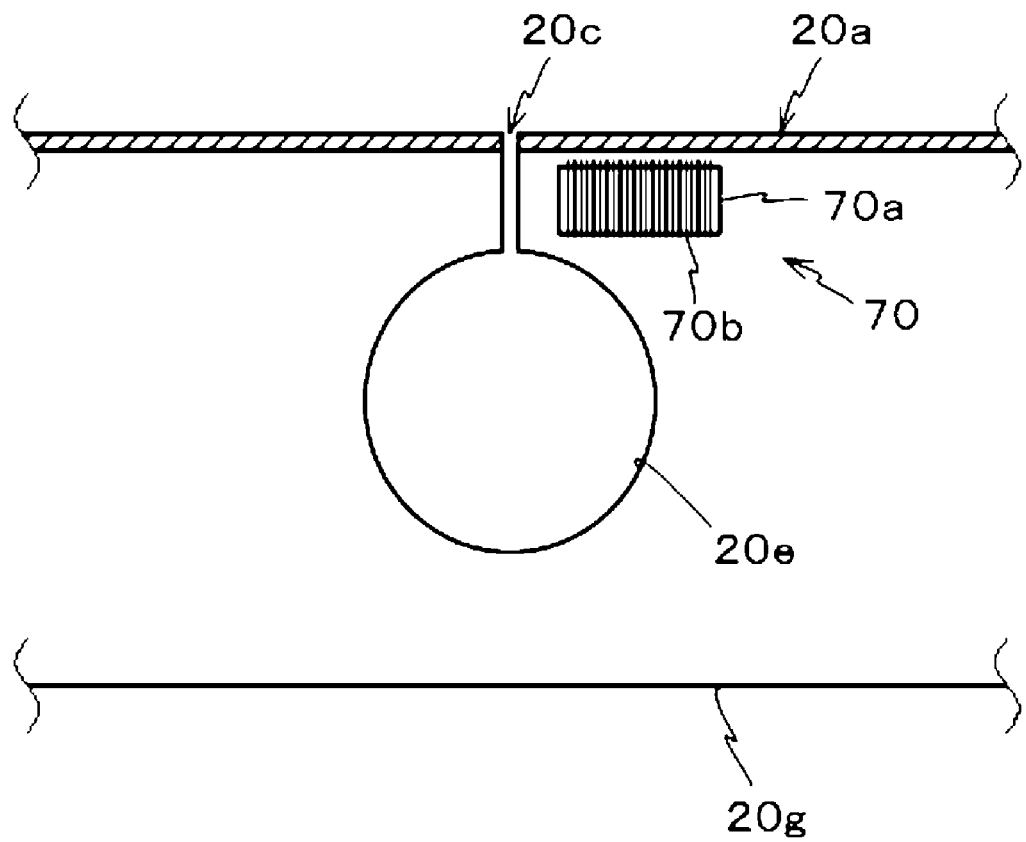
FIG. 19 illustrates a first metal housing and a chip coil.
Figure 20:
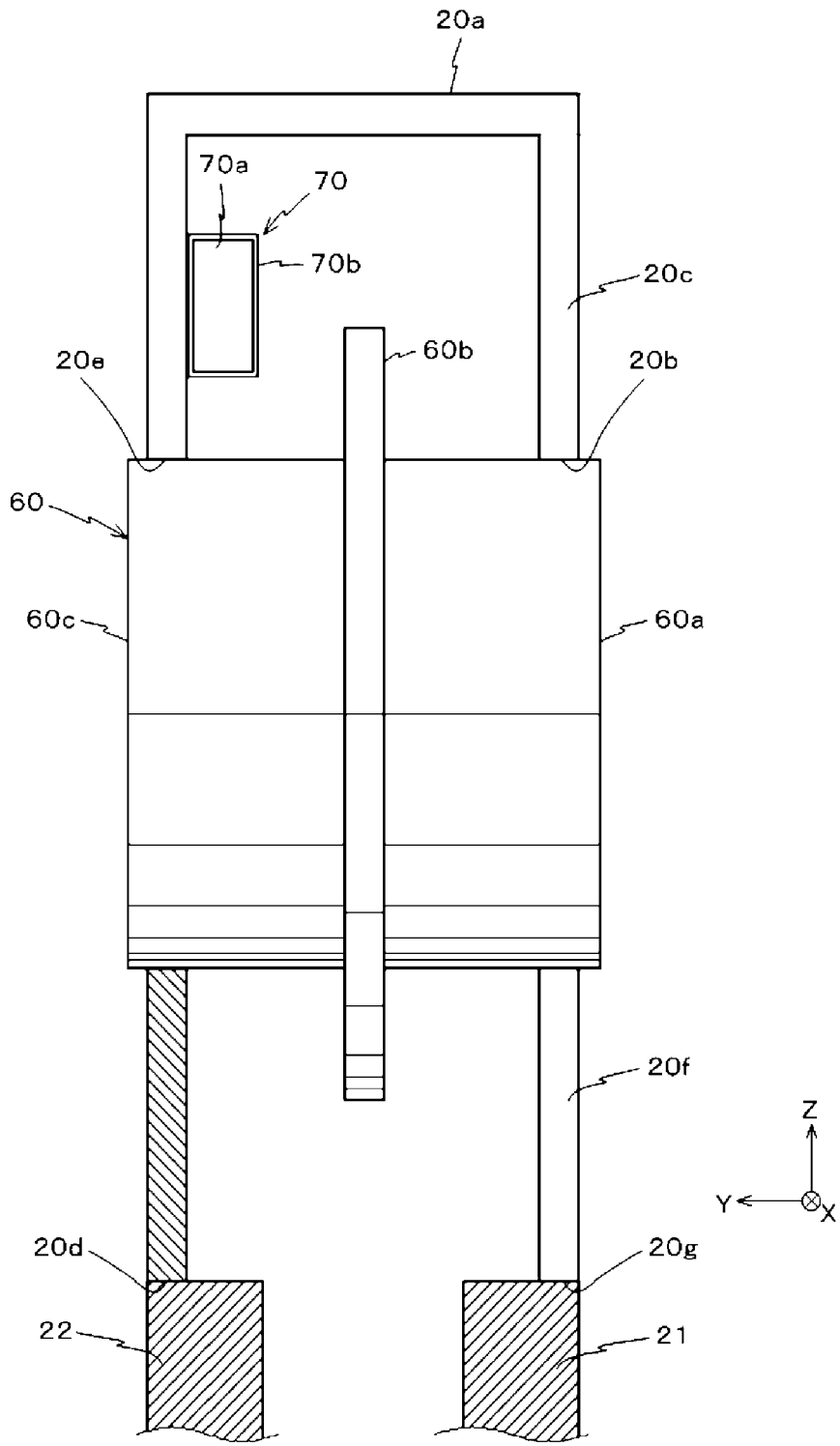
FIG. 20 illustrates a cross section of the first metal housing.

As illustrated in FIG. 19, the chip coil 70 preferably is disposed near a slit 20*c* provided in a second principal surface S2 of a first metal housing 20*a* such that the longitudinal direction thereof coincides with an X-axis direction. When current flows through the conductive wire 70*b*, induced current along the imaginary line of FIG. 16 flows in the first metal housing 20*a*. Thus, the chip coil 70 and the first metal housing 20*a* are magnetically coupled, and the first metal housing 20*a* functions as a radiation element of an NFC system.

In the above-described preferred embodiments, as illustrated in FIG. 3 or 14, the first metal housing 20*a* preferably includes openings defined by the slit and the aperture. Alternatively, the first metal housing 20*a* may include only a slit.

Figure 21:
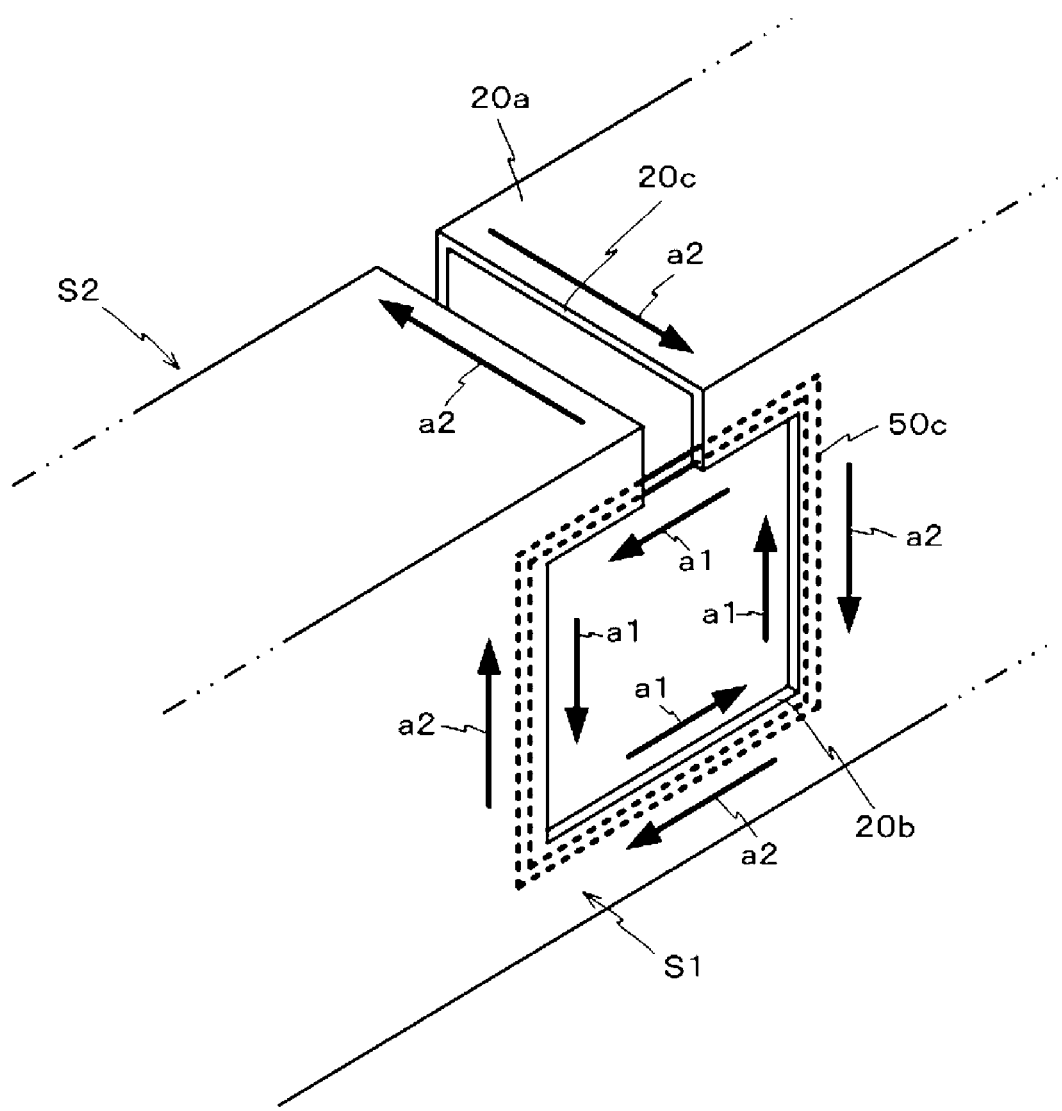
FIG. 21 illustrates the positional relationship between a power feeding coil and an aperture in the modification of a preferred embodiment of the present invention.

In the above-described preferred embodiments, as illustrated in FIG. 5, the aperture 20*b* of the first metal housing 20*a* and the power feeding coil 50*c* preferably are circular or substantially circular. Alternatively, the aperture 20*b* of the first metal housing 20*a* and the power feeding coil 50*c* may be rectangular, as illustrated in FIG. 21. In this case, as illustrated in FIG. 21, when current flows through the power feeding coil 50*c*, as shown by arrows a1, induced current flowing, as shown by arrows a2, is also guided to the first principal surface S1, the side surface, and the second principal surface S2 of the first metal housing 20*a*. The induced current guided to these surfaces allows the surroundings of the aperture 20*b* and the slit 20*c* of the first metal housing 20*a* to function as a radiation element of a magnetic-field radiation type.

The information terminal apparatus according to various preferred embodiments of the present invention is not limited to the notebook PC, but may be a cellular phone terminal, such as a smartphone, or an information communication terminal of a tablet type, for example.

The shape of the aperture provided in the first metal housing is not limited to the circular or substantially circular shape, and may be a rectangular or substantially rectangular shape. The width of the aperture may be equal or substantially equal to the width of the slit. Further, the camera does not always need to be disposed in the aperture. The slit is not limited to a linear slit having uniform width. For example, a portion of the slit may have a curved portion, a wide portion, or a narrow portion, for example.

The power feeding coil is not limited to the single-layer planar spiral coil, but may be a multilayer coil having two or more layers. Alternatively, a chip coil including a magnetic member, such as a ferrite sintered body, may be used as the power feeding coil. In this case, it is only necessary for the operator to dispose the chip coil near the slit so that an induced magnetic field of the chip coil can pass through the slit.

The HF-band RFID system is not limited to the NFC system, but may be an HF-band system such as FeliCa (registered trademark).

In the present invention, it should be noted that various preferred embodiments and modifications can be made without departing from the broad spirit and scope of the present invention. The above-described preferred embodiments are provided to illustrate the present invention and are not intended to limit the scope of the present invention.

The present invention is based on Japanese Patent Application No. 2012-278413 filed Dec. 20, 2012 and No. 2013-138582 filed Jul. 2, 2013. In this description, the specifications, claims, and drawings of Japanese Patent Application No. 2012-278413 and No. 2013-138582 are incorporated by reference in their entirety.

The information terminal apparatus according to various preferred embodiments of the present invention is suitable for near field communication with an external apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An information terminal apparatus comprising:
   a display;
   a conductive housing including a first principal surface, a second principal surface opposite to the first principal surface, a slit, a first aperture provided in the second principal surface, and a second aperture provided in the first principal surface; and
   a coil; wherein
   a front surface of a screen of the display is exposed to the first aperture;
   the slit extends from the first aperture to the second aperture;
   the coil is magnetically coupled to the conductive housing; and
   a width of the slit is smaller than a width of the first aperture.

2. The information terminal apparatus according to claim 1, wherein
   the coil is a power feeding coil; and
   the power feeding coil is disposed on a side of the first principal surface.

3. The information terminal apparatus according to claim 2, wherein a side of the power feeding coil facing the second principal surface is covered with a magnetic member.

4. The information terminal apparatus according to claim 2, wherein
   a camera unit is exposed from the second aperture;
   the power feeding coil includes a coil aperture; and
   the power feeding coil is disposed such that the coil aperture overlaps with the second aperture from which the camera unit is exposed.

5. The information terminal apparatus according to claim 2, wherein
   the power feeding coil is adjacent to the second aperture.

* * * * *